United States Patent [19]

Tryon

[11] 4,246,752
[45] Jan. 27, 1981

[54] TURBOCHARGED ENGINE CONTROL

[75] Inventor: Dean G. Tryon, Rochester, N.Y.

[73] Assignee: General Motors Corporation, Detroit, Mich.

[21] Appl. No.: 957,456

[22] Filed: Nov. 3, 1978

[51] Int. Cl.³ ............... F01N 3/10; F02B 75/10; F02B 33/44

[52] U.S. Cl. .................. 60/290; 60/280; 60/605; 60/611; 123/559; 123/585

[58] Field of Search ............ 60/280, 290, 605, 606, 60/600, 602, 611; 123/119 CE, 124 R, 119 D, 119 DB, 119 C

[56] References Cited

U.S. PATENT DOCUMENTS

| 2,380,967 | 8/1945 | Jarvis | 123/117 A |
|---|---|---|---|
| 3,196,606 | 7/1965 | Cholvin | 60/602 |
| 3,364,909 | 1/1968 | Mick | 60/290 |
| 3,380,245 | 4/1968 | Mick | 60/606 |
| 3,788,070 | 1/1974 | Camarasa | 60/290 |
| 3,903,695 | 9/1975 | Nakada | 60/290 |
| 4,091,620 | 4/1978 | Dorsch | 60/606 |

FOREIGN PATENT DOCUMENTS 367310 4/1938 Italy ................ 123/119 CE

Primary Examiner—Douglas Hart
Attorney, Agent, or Firm—C. K. Veenstra

[57] ABSTRACT

A diaphragm operated valve bleeds air to the induction passage of a turbocharged engine when the pressure increase across the turbocharger compressor exceeds the particularly high value occurring as the engine throttle is moved from a wide open position; the additional air leans the air-fuel mixture delivered to the engine and thereby prevents a brief pulse of engine power which might otherwise occur, minimizes emission of exhaust gas hydrocarbons and carbon monoxide, and avoids exhaust system backfire noise.

4 Claims, 1 Drawing Figure

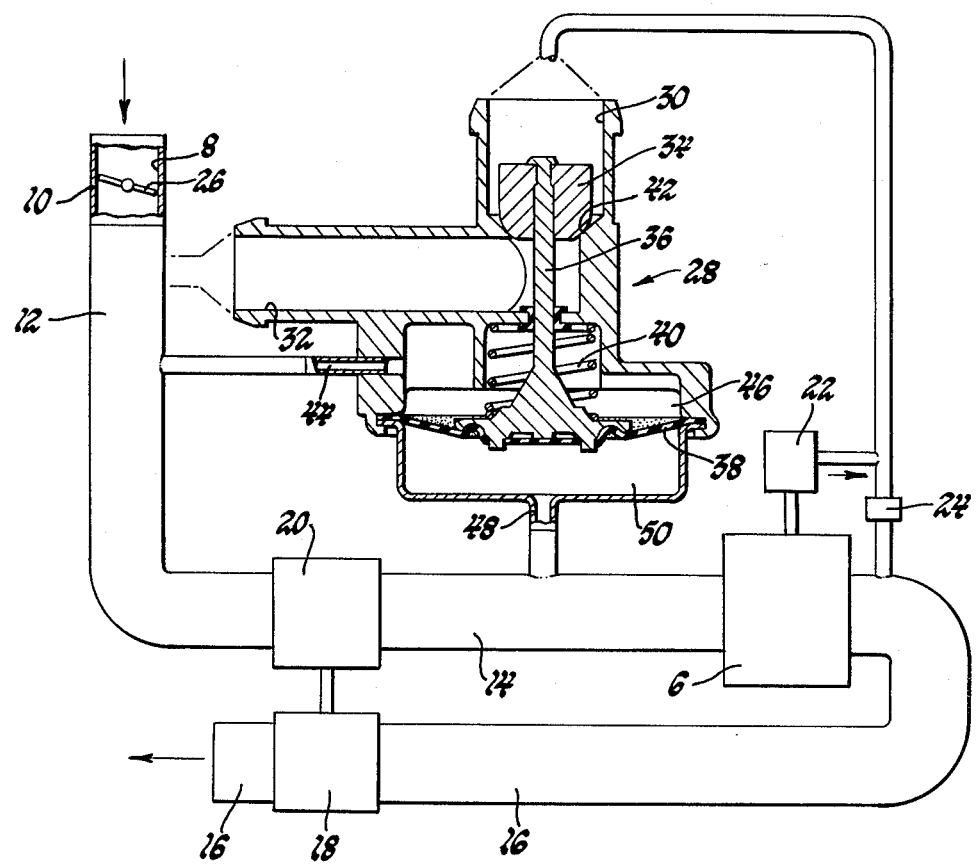

TURBOCHARGED ENGINE CONTROL

TECHNICAL FIELD

This invention relates to a control for a turbocharged engine which is actuated as the engine throttle is moved from an open position and which is especially useful to lean the air-fuel mixture delivered to the engine as the throttle is moved from an open position.

BACKGROUND

Automotive internal combustion engines occasionally receive a momentarily overly-rich air-fuel mixture upon movement of the engine throttle from an open position, perhaps due to evaporation of liquid fuel in the induction system. The rich mixture may lead to a brief pulse of engine power, to increased emission of unburned hydrocarbons and carbon monoxide, or to exhaust system backfire noise. Thus in such an engine, a valve may be employed to bleed additional air into the induction system to lean the air-fuel mixture as the throttle is moved from an open position, thereby preventing the brief pulse of engine power, minimizing the emission of exhaust gas hydrocarbons and carbon monoxide, and avoiding exhaust system backfire noise.

The previous valve cannot be employed in a turbocharged engine, however, for that valve responded to a rapid change in induction passage pressure which does not occur in a turbocharged engine.

SUMMARY OF THE INVENTION

This invention provides a control which senses the pressure increase across the turbocharger compressor and responds to the particularly high differential which is created as the throttle is moved from an open position. In a preferred embodiment of this invention, the control has a diaphragm responsive to that pressure differential which opens a valve to bleed air into the engine induction passage when the pressure differential exceeds the value occurring as the throttle is moved from an open position; the additional air leans the air-fuel mixture delivered to the engine to prevent the brief pulse of engine power which might otherwise occur, to minimize the emission of exhaust gas hydrocarbons and carbon monoxide, and to avoid exhaust system backfire noise.

The details as well as other features and advantages of this invention are set forth in the remainder of the specification and are shown in the accompanying drawing.

BRIEF DESCRIPTION OF THE DRAWING

The sole FIGURE of the drawing is a schematic view of a turbocharged engine having an intake air bleed valve control provided by this invention.

BEST MODE FOR CARRYING OUT THE INVENTION

Referring to the drawing, a turbocharged internal combustion engine 6 receives an air-fuel mixture through an induction passage 8 formed by a carburetor 10, an intake plenum 12, and an intake manifold 14. Exhaust gases are discharged from engine 6 through an exhaust passage 16. The turbocharger includes a turbine 18 disposed in exhaust passage 16 which drives a compressor 20 disposed in induction passage 8 between plenum 12 and manifold 14 to effect an increase in flow through induction passage 8.

An air pump 22 is driven by engine 6 to deliver air through a check valve 24 to exhaust passage 16; the air supports oxidation of unburned hydrocarbons and carbon monoxide in exhaust passage 16 to thereby minimize emission of those exhaust gas constituents to the atmosphere.

When carburetor throttle 26 is moved from a wide open position, the air fuel mixture delivered to the engine may become momentarily rich—apparently from evaporation of liquid fuel accumulated in induction passage 6. The rich mixture may lead to a brief pulse of engine power, to increased emission of exhaust gas hydrocarbons and carbon monoxide, or to exhaust system backfire noise.

This invention provides a control assembly 28 having an inlet 30 connected to receive air from air pump 22 and an outlet 32 for delivering air to induction passage 8. A bleed valve 34 controls air flow through assembly 28 and is connected by a stem 36 to an operating diaphragm 38. A spring 40 biases diaphragm 38, valve stem 36 and bleed valve 34 downwardly to engage bleed valve 34 with a valve seat 42, thus obstructing air flow through control assembly 28 to induction passage 8. A fitting 44 subjects the chamber 46 above diaphragm 38 to the pressure in intake plenum 12, and a fitting 48 subjects the chamber 50 below diaphragm 38 to the pressure in intake manifold 14. Diaphragm 38 thus senses the pressure increase across compressor 20.

During wide open throttle operation, the pressure in intake plenum 12 between throttle 26 and compressor 20 is approximately 1" Hg (3.34 kPa) below atmospheric pressure while the pressure in intake manifold 14 between compressor 20 and engine 6 is about 16" Hg (53.4 kPa) above atmospheric pressure. During operation at an intermediate throttle position, the pressure in intake plenum 12 drops to about 6" Hg (20 kPa) below atmospheric pressure while the pressure in intake manifold 14 drops to about 5" Hg (16.7 kPa) above atmospheric pressure. However, as throttle 26 is moved from its wide open position, the pressure in intake plenum 12 drops to about 6" Hg (20 kPa) below atmospheric pressure before the pressure in intake manifold 14 drops from 16" Hg (53.4 kPa) above atmospheric pressure.

Diaphragm 38 senses the pressure increase across compressor 20 and, when that pressure increase approaches 22" Hg (73.5 kPa, as throttle 26 is moved from its wide open position), lifts bleed valve 34 against the bias of spring 40 to divert some of the air flow from pump 22 to induction passage 8. The additional air leans the air-fuel mixture provided to engine 6, thus preventing the brief pulse of engine power that might otherwise occur, minimizing emission of exhaust gas hydrocarbons and carbon monoxide, and avoiding exhaust system backfire noise.

It will be appreciated that another embodiment of this invention may be used to divert all of the air flow from pump 22 to the atmosphere when the pressure increase across compressor 20 exceeds the value occurring as throttle 26 is moved from an open position, where that mode of control over the engine operating parameters is desired.

The embodiments of the invention in which an exclusive property or privilege is claimed are defined as follows:

1. In an engine having an induction passage, a throttle in said passage movable to and from an open position for controlling flow through said passage, and a compressor in said passage downstream of said throttle, the improvement comprising a control responsive to the difference between the pressure in said induction passage downstream of said compressor and the pressure in said induction passage between said compressor and said throttle and effective to vary an engine operating parameter only when said difference exceeds a value occurring only as said throttle is moved from said open position.

2. In an engine having an air-fuel mixture induction passage, a throttle in said passage movable to and from an open position for controlling flow through said passage, and a compressor in said passage downstream of said throttle, the improvement comprising a control responsive to the difference between the pressure in said induction passage downstream of said compressor and the pressure in said induction passage between said compressor and said throttle and effective to add air to said induction passage for leaning the air-fuel mixture therein only when said difference exceeds a value occurring only as said throttle is moved from said open position, whereby said control prevents the brief pulse of engine power which might otherwise occur as said throttle is moved from said open position.

3. In an engine having an air-fuel mixture induction passage, a throttle in said passage movable to and from an open position for controlling flow through said passage, a compressor in said passage downstream of said throttle, an exhaust passage, and a pump delivering air to said exhaust passage for supporting oxidation of exhaust gases therein, the improvement comprising a control having a diaphragm responsive to the difference between the pressure in said induction passage downstream of said compressor and the pressure in said induction passage between said compressor and said throttle, and a valve operated by said diaphragm to deliver air from said pump to said induction passage for leaning the air-fuel mixture therein only when said difference exceeds a value occurring only as said throttle is moved from said open position, whereby said control prevents the brief pulse of engine power which might otherwise occur as said throttle is moved from said open position.

4. In an engine having an induction passage, a throttle in said passage movable to and from an open position for controlling flow through said passage, a compressor in said passage downstream of said throttle, an exhaust passage, and a pump delivering air to said exhaust passage for supporting oxidation of exhaust gases therein, the improvement comprising a control responsive to the difference between the pressure in said induction passage downstream of said compressor and the pressure in said induction passage between said compressor and said throttle and effective to divert at least some of the air delivered by said pump away from said exhaust passage only when said difference exceeds a value occurring only as said throttle is moved from said open position.

* * * * *